United States Patent Office 3,101,273
Patented Aug. 20, 1963

3,101,273
BINDING COMPOSITION FOR FLOCK AND PROCESS FOR FLOCKING A TEXTILE FABRIC
Kuno Wagner, Richard Schwaebel, and Wilhelm Graulich, Leverkusen, Germany, assignors to Farbenfabriken Bayer Aktiengesellschaft, Leverkusen, Germany, a corporation of Germany
No Drawing. Filed Nov. 6, 1957, Ser. No. 694,751
Claims priority, application Germany Nov. 30, 1956
16 Claims. (Cl. 117—33)

The present invention relates to a process for fluffing and surfacing of textiles and for compositions for fluffing and coating of textiles.

In accordance with the invention it has been found that textile materials may advantageously be fluffed or surfaced by using as binding agents emulsions of water-insoluble or slightly soluble polymeric film formers along with water-soluble or dispersible methylol-group-containing N-methylol-polyethers obtained from poly-N-methylol compounds and polyhydric alcohols.

The water-soluble or dispersible N-methylol-polyethers to be used according to the invention are obtainable by condensation of poly-N-methylol compounds and polyhydric alcohols. There have proved to be particularly suitable for the present process condensation products from polymethylol ureas and tri-functional or higher functional alcohols, in admixtures, if desired, with any other alcohols, for example: poly-condensation products from polymethylol ureas and hexanetriol and butanedihydroxyethyl-glycol, hexanetriol, hydroxyethylated trimethylolpropane, glycerol in admixture with hexanetriol or hexanetriol in admixture with pentaerythritol or sorbitol. The manufacture of such high molecular N-methylol-polyethers, containing methylol- and methylolalkyl-ether groups, from poly-N-methylol compounds and polyfunctional polyhydric alcohols, or mixtures of polyhydric alcohols, containing ether or thioether groups, is described in copending application Serial No. 680,407, filed by Kuno Wagner and Erwin Müller on August 26, 1957, which application is' assigned to the same assignee. That application is now U.S. Patent No. 2,976,261.

Modification products of such N-methylol-polyethers with low molecular weight poly-M-methylol compounds (described in copending application Serial No. 698,939 which will be filed by Kuno Wagner and which application will be assigned to the same assignee) or with monofunctional alcohols may also be used.

Other suitable compounds are more strongly branched N-methylol-polyethers from poly-N-methylol compounds and any polyfunctional alcohols which are obtainable in the presence of very small amounts of acid without a premature cross-linking of the reaction mixtures, for example by condensing tri- and tetramethylol compounds of urea or dimethylol-urea in the presence of formaldehyde with tri- or higher functional alcohols or polyhydric alcohol mixtures of any alcohols.

N methylol-polyethers based on hexamethylene diurea, acid amides, adipic acid dihydrazide, diurethanes or acetylene ureas may also be employed.

Particularly suitable water-insoluble or slightly soluble polymeric film formers for the process of the invention or polymerisation products which contain methylol groups or methylolalkyl ether groups and, moreover, further reactive groups such as amide groups, hydroxy groups or ester groups. Polymers or co-polymers of compounds are preferably used which contain several times in the molecule the grouping

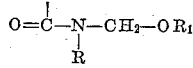

wherein R denotes a hydrogen atom, an alkyl or aryl radical and $R_1$ an alkyl radical. Polymers or co-polymers from compounds containing methylolether groups, for example from alkyl ethers of the methylol compound of acryl amide, methacryl amide, sorbic acid amide, or muconic acid diamides or of methylol compounds of unsaturated urethanes and unsaturated ureas, are obtainable according to the process of Belgian Patent 539,963.

Particularly advantageous for carrying out the process of the inventon are such co-polymers which contain butadiene, its homologues or derivatives, styrene and its substitution products, acrylonitrile, acrylic or methacrylic acid, acrylic acid- or methacrylic acid esters, acrylamide or methacrylamide, vinyl chloride, vinylidene chloride or organic vinyl esters along with methacrylamide-methylolmethylether. The preferred proportion of methacrylamide-methylolether in such co-polymers is less than 10 percent, referred to the total of monomeric components.

The type and quantity of the individual components are chosen dependent on the desired touch of the treated fabric.

Thus, a high proportion of, for example, butadiene or acrylic acid esters having more than 3 carbon atoms in the alcohol radical gives binding agents which impart a soft touch to the treated fabric. Acrylonitrile is known to yield films which are fast to solvents.

The aforesaid co-polymers may also be used together with any water-soluble polymers or co-polymers which contain for example amide-, hydroxyl-groups or COOH— groups, such as acrylamide, methacrylamide, polyvinylalcohol and polyacrylic acid.

In the cross-linking reaction the N-methylol-polyethers containing methylol groups, impart a good touch to the fabric on account of their softening properties, without reducing the fixation. The high molecular weight water-insoluble or slightly soluble polymeric film former is thereby converted into the insoluble state by self-cross-linking on the one hand, and by interaction with the water-soluble cross-linking agent (N-methylol-polyether), on the other hand.

The manufacture of the fluff print adhesives can be effected in any sequence, for example by mixing branched N-methylol-polyethers based on urea and rich in methylol-groups with the above mentioned polymeric film formers, whereby the usual thickeners and hydrophobing agents may be added.

In order to effect the complete condensation for the methylol compounds on the textile material, inorganic or organic acids or acid-splitting agents such as ammonium chloride, ammonium thiocyanate and the like are expediently added to the adhesive. The fabric is preliminarily coated with the adhesive and then electrostatically or mechanically fluffed, dried and condensed (fixed) at temperatures of between 100 and 150° C., the condensation time being adapted to the textile material.

As fluffing agents there may be used for example commercial rayon flocks.

The fluffed textiles distinguish themselves by a soft touch, excellent fastness to washing, rubbing and solvents including chlorinated hydrocarbons.

The following examples are given for the purpose of illustrating the invention without, however, limiting it thereto.

*Example 1*

A fabric is preliminarily coated with a fluff print adhesive having the following composition:

9.7 grams of a 71.4 percent solution of trimethylol-urea - hexanetriol-butanedihydroxyethylglycol-polyether (melting viscosity 10,000 centipoises at 75° C.),
68.4 grams of a 40 percent aqueous latex containing a co-polymer from butadine, acrylonitrile, styrene and methacrylamide-methylolmethyl ether in the ratio of 40:36:20:4,
11.4 grams of a 10 percent polyacrylamide solution,
7.6 grams of a 14 percent aqueous solution of a copolymer from acrylamide and methacrylamide-methylolmethyl ether (42:58) and 2.9 grams of a 25 percent ammonium chloride solution.

The fabric is then electrostatically or mechanically fluffed with commercial rayon flock. After drying the fabric is heated to 100° C. for 10 minutes. An outstanding fluffing is thus obtained on the textile material which is fast to washing, rubbing, light and to solvents.

*Example 2*

A fabric is preliminarily coated with a fluff print adhesive having the following composition:

9.7 grams of a 71.4 percent solution of a trimethylolurea - hexanetriol-butanedihydroxyethylglycol-polyether (melting viscosity 5,900 centipoises at 75° C.),
68.4 grams of a 40 percent aqueous latex containing a co-polymer from acrylic acid-butyl ester, acrylonitrile, methacrylamide and methacrylamide-methylol-methyl ether in the ratio of 60:34:2:4,
11.4 grams of a 10 percent polyacrylamide solution,
7.6 grams of a 14 percent aqueous solution of a copolymer from acrylamide and methacrylamide-methylolmethyl ether (42:58), and
2.9 grams of a 25 percent ammonium chloride solution.

According to the method of Example 1 an outstanding fixation on cotton, polyamide and polyurethane fabric and polyacrylonitrile fibres is obtained.

*Example 3*

A fabric is preliminarily coated with a fluff print adhesive having the following composition:

(a) 9.7 grams of a 71.4 percent solution of a trimethylolurea-hexanetriol-polyether (melting viscosity 15,570 centipoises at 75° C.), or
(b) 9.7 grams of a trimethylolurea-butanetriol-(1,2,4)-polyether (melting viscosity 2,500 centipoises at 75° C.), and
68.4 grams of a 40 percent aqueous latex containing a co-polymer from acrylic acid butyl ester, acrylonitrile and methacrylamide-methylol-methyl ether in the ratio of 60:36:4,
11.4 grams of a 10 percent polyacrylamide solution,
7.6 grams of a 14 percent aqueous solution of a co-polymer from acrylamide and methylacrylamide-methylolmethyl ether (42:58), and
2.9 grams of a 25 percent ammonium chloride solution.

According to the method of Example 1 outstanding fluffings are obtained on the textile material which are fast to washing, rubbing, light and to solvents.

*Example 4*

A fabric is preliminarily coated with a fluff print adhesive having the following composition:

(a) 9.7 grams of a 71.4 percent solution of a polyether from trimethylol urea and a hydroxyethylated trimethylolpropane (melting viscosity 2555 centipoises at 75° C.), or
(b) 9.7 grams of a 71.4 percent solution of a trimethylolurea-hexanetriol-butanedihydroxy-ethyl-glycol - polyether modified with hexamethylolmelamine by alkaline condensation, or
(c) 9.7 grams of a 71.4 percent solution of a trimethylolurea-hexanetriol-glycerol-diethyleneglycol - polyester (melting viscosity 9750 centipoises at 75° C.), or
(d) 9.7 grams of a trimethylolurea-hexanetriol- and sorbitol-polyether (melting viscosity 9320 centipoises at 75° C.), or
(e) 9.7 grams of a 71.4 percent solution of a N-methylol polyether from tetramethylol-hydrazodicarbonamide, hexanetriol and hydroxy-ethylated trimethylolpropane (melting viscosity 6780 centipoises at 75° C.), or
(f) 9.7 grams of a 71.4 percent solution of a N-methylolpolyether from tetramethylol-hexamethylene-di-urea, trimethylolurea, hexanetriol and butanedihydroxy-ethylglycol (melting viscosity 8360 centipoises at 75° C.), or
(g) 9.7 grams of a 71.4 percent solution of a N-methylolpolyether from trimethylolurea, tetramethylol-adipic acid diamide, butane-dihydroxyglycol and hexanetriol, and
68.4 grams of a 40 percent aqueous latex containing a co-polymer from butadiene, acrylonitrile, styrene and methacrylamide-methylol-methylether in the ratio of 40:36:20:4,
11.4 grams of a 10 percent polyacrylamide solution,
7.6 grams of a 14 percent aqueous solution of a copolymer from acrylamide and methacrylamide-methylol-methyl ether (42:58), and
2.9 grams of a 25 percent ammonium chloride solution.

After drying and condensation, fluffings are obtained having the same outstanding fastness properties as those of Examples 1–3.

We claim:
1. As a novel binding agent for adhering a fibrous flock to a textile surface, a composition consisting essentially of a major amount of a latex of a water-insoluble film-forming polymer of a monomer containing a terminal vinyl group, and a minor amount of an N-methylol-polyether prepared by the acid etherification of a poly-N-methylol compound and a monomeric aliphatic polyhydric alcohol.

2. In a process for fluffing a textile surface by coating the latter with a fibrous flock, the improvement comprising employing as the adhesive for said flock the composition of claim 1.

3. The binding agent of claim 1 wherein said N-methylol-polyether is prepared by the acid etherification of a poly-N-methylolated urea and a monomeric polyhydric aliphatic alcohol.

4. In a process for fluffing a textile surface by coating the latter with a fibrous flock, the improvement comprising employing as the adhesive for said flock the composition of claim 3.

5. The binding agent of claim 1 wherein said N-methylol-polyether is prepared by the acid etherification of a monomeric polyhydric aliphatic alcohol with a member of the group consisting of tetramethylol-hexamethylene-di-urea, tetramethylol-adipic acid diamide, tetramethylol-hydrazodicarbonamide, dimethylol urea, trimethylol urea, and tetramethylol urea.

6. In a process for fluffing a textile surface by coating the latter with a fibrous flock, the improvement comprising employing as the adhesive for said flock the composition of claim 5.

7. The binding agent of claim 1 wherein said N-methylol-polyether is prepared by the acid etherification of a poly-N-methylol monomer and a polyhydric alcohol selected from the group consisting of butanedihydroxyethylglycol, hexanetriol, butanetriol, tri-(beta-hydroxyethoxy-methyl)-propane, glycerol, diethylene glycol, sorbitol, and 1,3-di(beta-hydroxy-ethoxy)-2-hydroxy - propane.

8. As a novel binding agent for adhering a fibrous flock to a textile surface, a composition consisting essentially of a major amount of a latex of a water-insoluble film-forming polymer of a monomer containing a terminal vinyl group, and a minor amount of an N-methylol-polyether selected from the group consisting of tri- and tetra-methylol-urea-hexanetriol-butanedihydroxy - ethylglycol-polyether.

9. As a novel binding agent for adhering a fibrous flock to a textile surface, a composition consisting essentially of a major amount of a latex of a water-insoluble film-forming polymer of a monomer containing a terminal vinyl group, and a minor amount of an N-methylol-polyether selected from the group consisting of tri- and tetra-methylolurea-hexanetriol-polyether.

10. As a novel binding agent for adhering a fibrous flock to a textile surface, a composition consisting essentially of a major amount of a latex of a water-insoluble film-forming polymer of a monomer containing a terminal vinyl group, and a minor amount of an N-methylol-polyether selected from the group consisting of tri- and tetra-methylolurea-butanetriol-polyether.

11. As a novel binding agent for adhering a fibrous flock to a textile surface, a composition consisting essentially of a major amount of a latex of a water-insoluble film-forming polymer of a monomer containing a terminal vinyl group, and a minor amount of an N-methylol-polyether selected from the group consisting of tri- and tetra-methylolurea-glycerol-diethyleneglycol-polyether.

12. As a novel binding agent for adhering a fibrous flock to a textile surface a composition consisting essentially of a major amount of a latex of a water-insoluble film-forming vinyl polymer containing in the molecular repeating units of the formula:

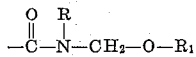

wherein R is a radical selected from the group consisting of H and lower alkyl, and $R_1$ is lower alkyl, together with a minor amount of an N-methylol-polyether prepared by the acid etherification of a poly-N-methylol monomer and a monomeric polyhydric aliphatic alcohol.

13. In a process for fluffing a textile surface by coating the latter with a fibrous flock, the improvement comprising employing as the adhesive for said flock the composition of claim 12.

14. The composition of claim 12 wherein said water-insoluble film-forming vinyl polymer is a polymer of methacrylamide-methylol-methyl ether.

15. In a process for fluffing a textile surface by coating the latter with a fibrous flock, the improvement comprising employing as the adhesive for said flock the composition of claim 14.

16. An improved process for fluffing a textile fabric which comprises the steps of first coating the fabric surface with an adhesive consisting essentially of a major amount of a latex of a butyl acrylate/acrylonitrile/methacrylamide/methacrylamide-methylol - methylether copolymer and minor amounts of a polyacrylamide solution, a trimethylol-urea-hexanetriol-butanedihydroxyethylglycol-polyether, a copolymer of acrylamide and methacrylamide-methylol-methyl ether, and a small amount of ammonium chloride, then applying a fibrous flock to the adhesive coating, and drying the resulting fluffed textile at a temperature of about 100° C., the resulting fluffed textile being fast to washing, rubbing, light, and solvents.

References Cited in the file of this patent
UNITED STATES PATENTS

| | | |
|---|---|---|
| 2,339,768 | D'Alelio | Jan. 25, 1944 |
| 2,350,894 | Honel | June 6, 1944 |
| 2,447,621 | Smidth | Aug. 24, 1948 |
| 2,504,136 | Lee | Apr. 18, 1950 |
| 2,514,505 | Morton | July 11, 1950 |
| 2,577,767 | Jones | Dec. 11, 1951 |
| 2,606,885 | Schmutzler | Aug. 12, 1952 |
| 2,681,036 | Ewing et al. | June 15, 1954 |
| 2,755,198 | Stewart | July 17, 1956 |
| 2,763,649 | Albrecht | Sept. 18, 1956 |
| 2,802,752 | Wood | Aug. 13, 1957 |
| 2,892,810 | Albrecht | June 30, 1959 |